Sept. 14, 1965 R. E. SEAL ETAL 3,205,573
METHOD OF BRAZING ALUMINUM TO A FERROUS METAL
Filed Jan. 31, 1963
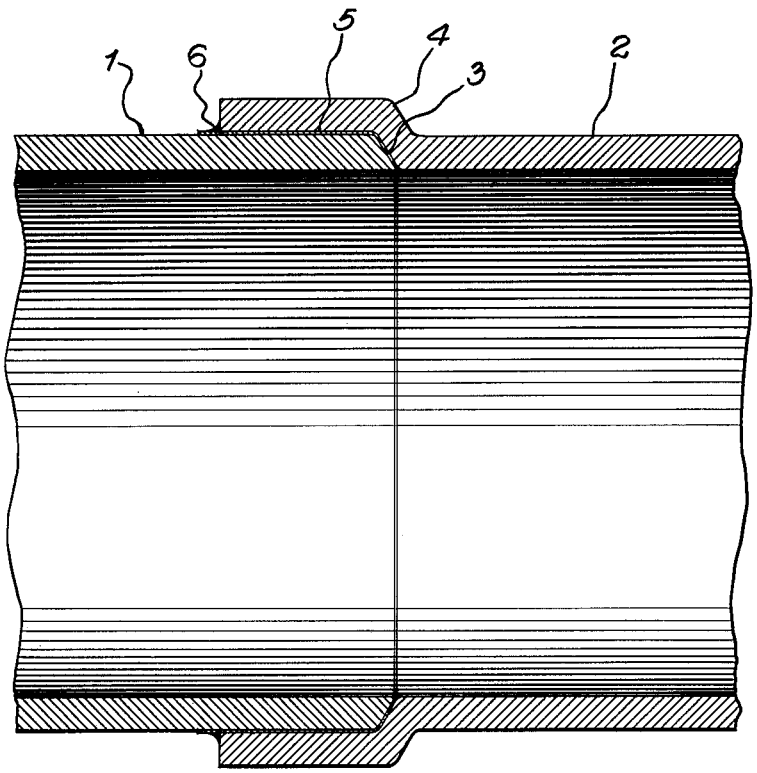
INVENTORS
REED E. SEAL
ROBERT R. SHELLMAN
BY
ATTORNEY 3,205,573
METHOD OF BRAZING ALUMINUM TO A FERROUS METAL
Reed E. Seal, Oakdale, and Robert R. Shellman, Northport, N.Y.; said Seal assignor to Dominick Monaco, Carlstadt, N.J.
Filed Jan. 31, 1963, Ser. No. 255,324
15 Claims. (Cl. 29—474.4)

This application is a continuation-in-part of our application Serial No. 131,469, filed August 15, 1961 and now abandoned.

Our invention is directed toward providing a method of brazing two dissimilar metals and more particularly toward a method of brazing a ferrous metal to pieces of aluminum or an alloy composed largely of aluminum.

There is a fundamental difference between welding and brazing. In welding each of the parent metals melts during the joining process. In brazing neither of the parent metals melts during the joining process. In braze welding one of the parent metals melts during the joining process.

It is an important object of our invention to provide a method for brazing a ferrous metal to aluminum or to an alloy composed largely of aluminum.

It is a further object of our invention to provide a method of brazing steel to aluminum or an alloy composed largely of aluminum.

It is a still further object of our invention to provide a method of brazing pipes or tubes of ferrous metal to those of aluminum or of an alloy composed largely of aluminum.

These and other objects, advantages, uses and features of our invention will become apparent as the description proceeds.

Up to the present time it has not been feasible to braze ferrous metals to certain nonferrous metals. Prime examples of such nonferrous metals are aluminum and alloys containing a substantial amount of aluminum. We have discovered that it is possible to braze these nonferrous metals to steels if the steel piece is coated with aluminum such that an intermetallic compound is formed at the interface. The actual brazing takes place between the aluminum coating and the nonferrous aluminum or aluminum alloy piece. We have improved the quality of these brazed joints by knurling the steel prior to coating the steel with the aluminum. The knurling helps promote a thicker aluminum metallic overlay during the coating process. The knurling also provides a "gripping" surface for the braze material and allows it to flow better and more uniformly during the brazing cycle.

There have been attempts at joining aluminum or aluminum alloy pieces to ferrous pieces which have been coated with aluminum by welding and without fluxes. Such a technique has been described in Grenell U.S. Patent 2,769,231, November 6, 1956. By using the method of our invention, we have been able to braze steel pieces to aluminum pieces or aluminum alloy pieces. The only limitation on our process has been brazability of the particular aluminum alloy.

We have been able to braze an aluminum tube or pipe to a ferrous tube or pipe of the same size by swaging or spinning one end of the aluminum pipe open to receive the coated ferrous pipe. This results in a stronger and much more attractive finished joint. The joint may also be improved by swedging the end of the ferrous pipe down to a mating fit. The ferrous segment may be machined to a taper to provide an interference fit at the bottom of the joint.

In the figure, wherein, we have illustrated an example of a stainless steel pipe brazed to an aluminum pipe, the numeral 1 designates the stainless steel pipe whose end is machined to a taper as shown at 3. Aluminum pipe 2 is swaged open as shown at 4 so that pipe 1 will mate therein. Prior to mating the two pipes and brazing them together, steel pipe 1 is coated with a thin layer of aluminum 5. The details of applying this layer are described further on in this specification. After the layer 5 has been applied to pipe 1, pipes 1 and 2 are mated as shown in the drawing and the braze material is introduced into the joint. The braze material forms a fillet as is shown at 6 in the figure.

It is necessary to mask those portions of the ferrous piece, which are not to be covered with the aluminum coating, with a colloidal suspension of graphite which is commonly known as Aquadag, Prodag, or Dixonac #10. The masked ferrous piece is dipped in the bath of molten aluminum and the aluminum adheres to those portions of the ferrous metal which are not covered by the masking material. When the ferrous piece is cleaned, it is seen to be coated with the aluminum where it was not covered with the masking material and to be uncoated where it was covered with the masking material. It is important to be able to effectively mask the ferrous piece so that it retains its ferrous properties. This is so because after the ferrous and nonferrous pieces are brazed together it is often necessary to join the ferrous piece to another ferrous piece by ferrous welding or similar techniques. This would not be possible if the ferrous piece had not been masked and was consequently completely covered with aluminum coating.

To restrict the expansion of the nonferrous piece during the brazing cycle, we have bound the piece with bands which are preferably made of stainless steel. If the expansion of large nonferrous pieces is not restricted, the expansion is great enough to upset the tolerances of the faying surfaces with resulting poor quality brazed joints.

By way of illustration and not by way of limitation, following is an example of the brazing of steel to aluminum employing the teachings of our invention:

(1) The steel piece is cut to the proper length, machined, and knurled in the area to be joined to the nonferrous piece to a depth of the order of 0.003" to 0.005".

(2) The steel piece is degreased with perchlorethylene at a temperature of about 250° F.

(3) The steel piece is then mechanically cleaned by grit blasting.

(4) The steel piece is put back into the degreaser to clean and warm it to a temperature of about 150° F. in preparation for masking.

(5) The steel piece is masked as required with a colloidal suspension of graphite such as that which is commonly known as Dixonac #10. This step is preferably carried out while the piece is warm (about 150° F.)

(6) The steel piece is dipped in a bath of molten aluminum having a temperature between 1250° F. and 1380° F. The molten bath is normally pure aluminum with up to 3% impurities which are mainly iron and silicon.

(7) The steel piece is left in the molten bath long enough for the mass to reach the temperature of the molten aluminum plus about three to five minutes. If the time is too long, the coating becomes brittle and tends to spall. The angle of immersion must be such that no air is trapped during insertion of the steel piece into the molten bath. The angle of withdrawal must be such that no excess aluminum adheres to the piece.

(8) If the coated piece oxidizes, it should be mechanically cleaned with a material such as emery and not with a chemical cleaner such as sodium hydroxide.

(9) The aluminum piece is machined to the proper tolerance on the faying surfaces.

(10) The aluminum piece is cleaned to remove all oxidation. This cleaning may be chemical or mechanical.

(11) The clearance is checked. We have found a clearance of 0.002" to 0.04" per side or 0.004" to 0.008" on the diameter to be best.

(12) Mate the joint and, if necessary, place the combination in a fixture to hold the combination in the mated position. If necessary, apply stainless steel bands to the aluminum piece to prevent it from overexpanding.

(13) Alloy the joint using a nonferrous brazing alloy such as Handy & Harmon Alumibraze, Alcoa #718 shim stock, Alcoa #716 wire or similar material. Sufficient alloy must be applied to insure drawing the braze for the full depth of the joint and to form a properly shaped and sized fillet for the expected stresses.

(14) The mated combination is air dried.

(15) The mated combination is preheated at about 900° F. to 1100° F. for sufficient time to obtain a complete soak at temperature. The preheating temperature should be below the melting points of the brazing alloy and the parent metals of which the pieces are formed.

(16) The fixture and the mated combination are immersed in a flux bath of Park Chemical "D" salt, Alcoa #34 or similar material. The angles of immersion and withdrawal must be such that there is no distortion of the mated combination. The tempertaure of the bath and the time in the bath must be such that complete brazing is attained. We have found that the time should be approximately 5 seconds for a combination joint thickness of $\frac{1}{16}$", approximately 195 seconds for a combination joint thickness of 2", and approximately 300 seconds for a combination joint thickness of 3". By "combination joint thickness" we mean, for example, the shortest distance from the inner surface of the inner pipe or tube through the joint to the outer surface of the outer pipe or tube. The temperature of the flux bath should be of the order of 980° F. to 1190° F., must be above the melting temperature of the brazing alloy but below the melting temperature of either of the parent metals of which the pieces are formed.

(17) Air cool the mated combination.

(18) Boil the mated combination in water to remove the excess flux.

(19) Clean the mated combination to remove all oxidation. Chemical or mechanical cleaning may be used.

The mated combination is now ready for use.

If the nonferrous piece is a pipe or tube, we have found it advantageous to swage it open as shown in the figure. We are thereby able to obtain a smoother, more attractive joint.

The mated combination may be heat treated to improve the properties of heat treatable nonferrous metals or their alloys as follows:

(1) Heat the combination to the solution heat treatment temperature of about 800° F. to 1000° F. for sufficient time to obtain complete soak at temperature. In all cases, this temperature should be below the melting points of the brazing alloy and the parent metals.

(2) Force air quench the combination to reduce the temperature to below 300° F. in as rapid time as is possible without unequal cooling of the combination.

(3) Artificially age the combination at a temperature of the order of 300° F. to 450° F. for about 6 to 18 hours depending on the aging temperature and the particular nonferrous metal being treated.

While we have disclosed our invention in relation to a specific example and in a specific embodiment, we do not wish to be limited thereto, for obvious modifications will occur to those skilled in the art without departing from the spirit and scope of our invention.

Having thus described the invention, we claim:

1. The method of brazing a piece of aluminum or an alloy composed largely of aluminum to a piece of ferrous metal which comprises:
   degreasing the surface of the ferrous metal;
   cleaning the surface of the ferrous metal;
   masking the portion of the surface of the ferrous metal which is to remain uncoated;
   dipping the ferrous metal in molten metal composed largely of aluminum and having a temperature of the order between 1250° F. and 1380° F. for a time sufficient for the mass to reach the temperature of the molten metal;
   leaving the ferrous metal in the molten metal for a period of about three to five minutes after the mass reaches the temperature of the molten metal;
   cleaning the coated ferrous metal piece;
   cleaning the aluminum piece;
   mating the portions of both pieces to be joined together and holding them in a fixture in the mated position;
   applying a brazing alloy to the mated joint;
   drying the mated combination;
   preheating the mated combination for sufficient time to obtain soak at temperature below the melting points of the metal pieces and the brazing alloy;
   inserting the fixture and the mated combination in a flux bath having a temperature above the melting point of the brazing alloy and below the melting points of the metal pieces for a period of time of the order of 5 to 300 seconds;
   cooling the mated combination; and
   removing the excess flux from the surfaces of the mated combination.

2. The method of claim 1 wherein the surface of the ferrous metal piece is degreased with perchlorethylene at a temperature of approximately 250° F. and the surface of the ferrous metal piece is suitably masked with a colloidal suspension of graphite.

3. The method of claim 2 wherein the temperature during preheating is of the order between 900° F. and 1100° F. and the temperature of the flux bath is of the order between 980° F. and 1190° F.

4. The method of claim 1 wherein the temperature during preheating is of the order between 900° F. and 1100° F. and the temperature of the flux bath is of the order between 980° F. and 1190° F.

5. The method of claim 3 including knurling the portion of the surface of the ferrous piece to be coated with aluminum to a depth of about 0.003" to 0.005".

6. The method of claim 1 which includes:
   applying steel bands to the aluminum piece prior to applying brazing alloy to the joint to limit the thermal expansion of the piece;
   heating the brazed combination to a solution heat treating temperature of about 800° F. to 1000° F. for sufficient time to obtain soak at temperature;
   force air quenching the combination to reduce its temperature to about 300° F. without unequal cooling thereof; and
   artificially aging the combination at a temperature of the order of 300° F. to 450° F. for a period of between about 6 to 18 hours.

7. The method of claim 3 which includes:
   applying steel bands to the aluminum piece prior to applying brazing alloy to the joint to limit the thermal expansion of the piece;
   heating the brazed combination to a solution heat treating temperature of about 800° F. to 1000° F. for sufficient time to obtain soak at temperature;
   force air quenching the combination to reduce its temperature to about 300° F. without unequal cooling thereof; and
   artificially aging the combination at a temperature of the order of 300° F. to 450° F. for a period of between about 6 to 18 hours.

8. The method of claim 5 which includes:
   applying steel bands to the aluminum piece prior to applying brazing alloy to the joint to limit the thermal expansion of the piece;
   heating the brazed combination to a solution heat treating temperature of about 800° F. to 1000° F. for sufficient time to obtain soak at temperature;

force air quenching the combination to reduce its temperature to about 300° F. without unequal cooling thereof; and artificially aging the combination at a temperature of the order of 300° F. to 450° F. for a period of between about 6 to 18 hours.

9. The method of claim 1 wherein both metal pieces are pipes and which includes:

swaging one end of the pipe of aluminum or aluminum alloy to a size sufficient to receive the ferrous pipe; and machining the end of the ferrous pipe to be inserted in the aluminum pipe to a taper which cooperates with the swaged opening in the aluminum pipe.

10. The method of claim 3 wherein both metal pieces are pipes and which includes:

swaging one end of the pipe of aluminum or aluminum alloy to a size sufficient to receive the ferrous pipe; and machining the end of the ferrous pipe to be inserted in the aluminum pipe to a taper which cooperates with the swaged opening in the aluminum pipe.

11. The method of claim 4 wherein both metal pieces are pipes and which includes:

swaging one end of the pipe of aluminum or aluminum alloy to a size sufficient to receive the ferrous pipe; and machining the end of the ferrous pipe to be inserted in the aluminum pipe to a taper which cooperates with the swaged opening in the aluminum pipe.

12. The method of claim 5 wherein both metal pieces are pipes and which includes:

swaging one end of the pipe of aluminum or aluminum alloy to a size sufficient to receive the ferrous pipe; and machining the end of the ferrous pipe to be inserted in the aluminum pipe to a taper which cooperates with the swaged opening in the aluminum pipe.

13. The method of claim 6 wherein both metal pieces are pipes and which includes:

swaging one end of the pipe of aluminum or aluminum alloy to a size sufficient to receive the ferrous pipe; and machining the end of the ferrous pipe to be inserted in the aluminum pipe to a taper which cooperates with the swaged opening in the aluminum pipe.

14. The method of claim 7 wherein both metal pieces are pipes and which includes:

swaging one end of the pipe of aluminum or aluminum alloy to a size sufficient to receive the ferrous pipe; and machining the end of the ferrous pipe to be inserted in the aluminum pipe to a taper which cooperates with the swaged opening in the aluminum pipe.

15. The method of claim 8 wherein both metal pieces are pipes and which includes:

swaging one end of the pipe of aluminum or aluminum alloy to a size sufficient to receive the ferrous pipe; and machining the end of the ferrous pipe to be inserted in the aluminum pipe to a taper which cooperates with the swaged opening in the aluminum pipe.

References Cited by the Examiner

UNITED STATES PATENTS

| | | | |
|---|---|---|---|
| 2,686,354 | 8/54 | Lundin | 29—495 |
| 2,769,231 | 11/56 | Grenell | 29—471.7 |
| 2,809,423 | 10/57 | Hanink | 29—504 X |

OTHER REFERENCES

Modern Metals, April 1948, pages 13–15, 29–197.

JOHN F. CAMPBELL, *Primary Examiner.*